United States Patent

[11] 3,607,695

| [72] | Inventor | Paul Schneider |
| | | Spring Valley, N.Y. |
| [21] | Appl. No. | 799,526 |
| [22] | Filed | Feb. 14, 1969 |
| [45] | Patented | Sept. 21, 1971 |
| [73] | Assignee | Chas. Pfizer & Co., Inc. |
| | | New York, N.Y. |

[54] HEMOGLOBINOPATHY CONTROLS
6 Claims, No Drawings

[52] U.S. Cl. .................................................. 204/180 S,
204/180 G, 23/230
[51] Int. Cl. .................................................. B01k 5/00
[50] Field of Search .......................................... 23/230 B;
204/180 S, 180 R, 180 G

[56] References Cited
UNITED STATES PATENTS

| 2,541,056 | 2/1951 | Heftmann.................. | 23/230 |
| 2,843,540 | 7/1958 | Ressler..................... | 204/180 S |
| 3,062,731 | 11/1962 | Durrum..................... | 204/180 |
| 3,399,127 | 8/1968 | Rand et al.................. | 204/180 G |

*Primary Examiner*—Howard S. Williams
*Assistant Examiner*—A. C. Prescott
*Attorney*—Connolly & Hutz

ABSTRACT: A diagnostic method for the detection of abnormal hemoglobins in the blood of humans by conversion to cyanmethemoglobins and electrophoretic comparison with similarly treated hemoglobin controls.

HEMOGLOBINOPATHY CONTROLS

BACKGROUND OF THE INVENTION

This invention relates to an improved means for diagnosing a pathological condition. More particularly, it is concerned with a diagnostic method for detecting and identifying abnormal hemoglobins in the blood of humans.

Hemoglobinopathies constitute a group of hereditary hemolytic syndromes that is characterized by the presence of an abnormal hemoglobin. The abnormal hemoglobin is inherited. The classification of this group is based on electrophoretic studies, and thus far, 24 types of hemoglobin have been isolated. More hemoglobin are likely to be found in the future. The different hemoglobins have been designated by letters of the alphabet, e.g., normal hemoglobin (Hb) by A, sickle-cell Hb by S, and other variants by C, D, etc.

The more commonly occurring hemoglobinopathies are Sickle-Cell Disease and Hemoglobinopathy C Anemia. These disorders, debilitating and sometimes fatal, represent homozygous states occurring in offspring from the union of two trait carriers. Hemoglobinopathy A-S (sickle-cell trait) and Hemoglobinopathy A-C (hemoglobin C trait) represent heterozygous states, and are not usually associated with clinical manifestations or hematologic abnormalities except for alterations in mechanical and osmotic fragilities of erythrocytes.

Identification of sickle-cell trait or hemoglobin C trait is of particular importance because of the unfavorable interaction of pregnancy with these genetic diseases. Identification of sickle-cell anemia or sickle-cell trait is of special importance in the Air Force since airmen suffering from these abnormalities can develop splenic infraction due to low oxygen tension at moderate or high altitudes.

The isoelectric points of mammalian hemoglobin are usually just on the acid side of pH 7. Slight variations in the isoelectric points of the various hemoglobins provide the basis for their recognition by electrophoresis. In zone electrophoresis components migrate as separate zones and are stabilized against convection by the supporting media which may be filter paper or starch gel or starch grain block preparations. The simplicity of the operation and the small amount of hemoglobin required for a single analysis permit the screening of a large number of people in a short period of time.

Prior processes involving the preparation of hemoglobin samples for electrophoresis employ distilled water to hemolyze the red blood cells. This leads to unstable hemolysates containing mixtures of oxyhemoglobins, carboxyhemoglobins, and other hemoglobin derivatives. These unstable mixtures of hemoglobins are difficult to separate and identify by electrophoresis because broad unresolved bands are obtained.

A superior feature of the present invention is the use of Drabkin's reagent [$NaHCO_3$ (80 percent), $K_3Fe(CN)_6$ (16 percent), KCN (4 percent)] which uniformly converts all the hemoglobins to their cyanmethemoglobin forms. The distinguishing advantages of this test procedure are (a) all hemoglobins are in a single derivative form, (b) the cyanmethemoglobins are stable (6 months at 4°–10° C.), and (c) sharp resolved bands are obtained by electrophoresis. Identification of the abnormal hemoglobin in suspect bloods is readily made by side by side electrophoretic comparisons with hemolysates of control bloods containing the cyanmethemoglobins from normal hemoglobin (Hb A), sickle-cell trait hemoglobin (Hb A-S) and hemoglobin C trait (Hb A-C). The number of hemoglobinopathy type controls can be extended as desired.

SUMMARY OF THE INVENTION

The present invention embodies an improved diagnostic procedure for the detection and identification of abnormal hemoglobins in human blood which involves the use of a reagent that hemolyzes the suspect red blood cells and simultaneously converts all the hemoglobins to cyanmethemoglobins. These hemolysates are characterized by their uniformity, excellent stability, and sharp resolution by electrophoresis. This improved diagnostic method facilitates the identification of abnormal hemoglobins by the side by side electrophoretic comparisons of the suspect cyanmethemoglobins with the cyanmethemoglobins from normal hemoglobin (Hb A), sickle-cell trait hemoglobin (Hb A-S) and hemoglobin C trait (Hb A-C).

DETAILED DESCRIPTION OF THE INVENTION

The present invention relates to a diagnostic method for detecting and identifying abnormal hemoglobins in the blood of humans. A critical feature of this invention is the preparation of stable hemoglobinopathy controls which comprises hemolyzing the washed, packed red blood cells, converting the hemoglobins in the hemolysate to cyanmethemoglobins, and comparing the hemolysate by electrophoresis with similarly converted hemolysates of suspect blood cells.

Red blood cells for the hemoglobinopathy controls are selected from donors having the specific hemoglobin types desired, e.g., A A-S, A-C, etc. After centrifugation of the whole bloods, the packed red blood cells are washed several times with physiological saline to remove contaminating plasma proteins.

The term "physiological saline" refers to an 0.85 percent of 0.90 percent by weight aqueous sodium chloride solution.

The hemolyzing agent is dry powder containing sodium bicarbonate (75 percent –85 percent), potassium ferricyanide (15 percent–20 percent) and potassium cyanide (2 percent –6 percent). The hemolyzing solution is prepared by dissolving 120 mg. of the powder mixture in 100 ml. of distilled water. The working reagent solution is stable for approximately 1 year when stored at room temperature in a tightly capped amber glass or polyethylene bottle. The washed red blood cells are hemolyzed by adding the hemolyzing solution in a ratio of about 2–4 volumes of reagent solution to about 1 volume of washed, packed red blood cells. After standing at room temperature for approximately 1 hour, all the hemoglobins in the hemolysates are converted to cyanmethemoglobins.

The cell membranes, or stromata, are removed by centrifugation, and the hemolysates are further clarified by shaking out with water-immiscible organic solvent such as toluene or chloroform.

It has been previously established that cyanmethemoglobin complexes follow Beer's law and can be quantitated photometrically. After the hemoglobin content with the hemolyzing solution to a final hemoglobin concentration of about 7.0 percent–9.0 percent preferably, to 6.5 percent.

In order to minimize potential bacterial growth under subsequent storage conditions, the clear, ruby red hemolysates are sterilized by filtration under pressure through fritted glass bacterial filters or Millipore 0.45μ pads.

Hemolysates of the suspect blood samples are prepared in the same manner described for the hemoglobinopathy control hemolysates except that the sterile filtration and hemoglobin determination and dilution steps may be omitted.

The electrophoretic mobilities of the cyanmethemoglobins in the test and control samples are compared by standard electrophoretic methods. The type of supporting medium is not critical. It has been found that cyanmethemoglobins are resolved into sharp bands employing cellulose acetate (Sepraphore 111, Gelman Instrument Company, Ann Arbor, Mich.), and applying for 2hours a constant voltage of 200 volts and a current density of 1 ma. per 1 inch×6¼ inch strip. A variety of buffers for electrophoresis may be used with satisfactory results. A particularly effective buffer is a Veronal solution, pH 8.6, ionic strength 0.019 prepared by dissolving 0.69 grams diethyl barbituric acid and 3.85 grams diethyl barbiturate in 1 liter of water.

Electrophoretic patterns of the cyanmethemoglobins of normal and abnormal hemoglobins show that the derivative of Hb A migrates most rapidly toward the anode, followed by Hb S, while Hb C is slowest. Because of these differences in rates of migration, each hemoglobin produces a distance band. The zones are clear enough to see that there is a single zone in the position of Hb A, Hb S, and Hb C. Normal hemoglobin gives a single zone in the Hb A area. Sickle-cell disease exhibits an electrophoretic pattern with two zones - one each in the Hb A area and Hb S area. Similarly, hemoglobinopathy C trait shows two zones - one in the Hb A area and the other in the Hb C area.

The following examples are given by way of illustration and should not be interpreted as limiting the invention, the scope of which is defined by the appended claims.

EXAMPLE I

Samples of oxalated or citrated whole blood selected from donors having specific hemoglobin types Hb A, Hb A-S, and Hb A-C are centrifuged for 15 minutes at 1,600 r.p.m. The plasma is then removed and discarded. The packed red blood cells are washed four times with an equal volume of physiologic saline, and centrifuged at 2,000 r.p.m. for 30 minutes after each washing.

The reconstituted hemolyzing solution [120 mg. per 100 ml. of distilled water of powder mixture containing $NaHCO_3$ (80 percent), $K_3Fe(CN)_6$ (16 percent), KCN (4 percent)] is added at the ratio of 2.5 volumes to each volume of washed packed red blood cells.

The red blood cells and hemolyzing solution are thoroughly mixed, and allowed to stand for 1 hour at room temperature. One quarter the volume of chloroform is added to each volume of hemolysate, and thoroughly mixed.

The mixture is centrifuged for 20 minutes at 2,800 r.p.m. The clear, ruby red supernatant hemolysates are decanted.

The hemolysates are filtered under pressure through a Millipore 0.45 pad.

The hemoglobin content of each hemolysate is determined spectrophotometrically, and then diluted with hemolyzing solution to give a hemoglobin concentration of approximately 6.5 percent.

By means of an automatic pipetting machine, glass vials are filled with 0.5 ml. aliquots of each of the hemoglobinopathy control hemolysates. The vials are stored at 4°-10° C.

EXAMPLE II

The procedure of example I is repeated using toluene in place of chloroform.

EXAMPLE III

Suspect blood samples are treated according to the procedure of example I except that the Millipore filtration and hemoglobin determination and dilution steps may be omitted.

EXAMPLE IV

Test Procedure

With a hemoglobin pipet, a 0.02 ml. drop of prepared hemoglobin solution is placed on the cellulose acetate (Sepraphore III). The unknown hemoglobins are alternated with samples of known hemoglobins placed in a straight line in the center of the cellulose acetate. The drops are placed approximately 1 inch apart, making sure that the hemoglobin drops are aligned in a straight line.

The reservoirs are filled with veronal buffer solution (pH 8.6, ionic strength 0.019). An equal level is maintained by means of a connecting rubber tube which is clamped off after the level of the fluid is equal in both reservoirs. The lower glass plate is then set between the edges of the two reservoirs.

The cellulose acetate which contains the droplets of hemoglobin is saturated with buffer by immersing the cellulose acetate into the solution. The strip is then placed on the lower glass plate in such a manner that the hemoglobin drops are midway between the two electrodes. The upper glass plate is placed over the cellulose acetate strip, in line with the lower plate. Clamps are placed along the two edges.

The two electrodes in each reservoir are attached to the terminal with small bulldog clamps. The power supply is adjusted to deliver 200 volts and a current density of 1 ma. per 1 inch ×6¼ inch strip.

Two hours is usually sufficient for adequate migration.

EXAMPLE V

The test procedure of example IV is repeated using filter paper (Whatman No. 3) in place of cellulose acetate (Sepraphore III).

EXAMPLE VI

The test procedure of example IV is repeated using starch gel in place of cellulose acetate (Sepraphore III).

What I claim is:

1. A method for identifying normal and abnormal hemoglobins in human red blood cells which comprises hemolyzing said cells, converting said hemolysate to cyanmethemoglobins, and subjecting said converted hemolysate to electrophoresis in comparison with similarly converted hemolysates of known blood cells.

2. The method of claim 1 wherein said hemolysis and conversion are simultaneously effected by contacting said cells with aqueous solution of reagent comprising about 75percent –85 percent sodium bicarbonate, 15 percent –20 percent potassium ferricyanide and 2 percent –6 percent potassium cyanide.

3. The method of claim 2 wherein said reagent comprises about 80 percent sodium bicarbonate, about 16 percent potassium ferricyanide and about 4 percent potassium cyanide.

4. The method of claim 1 wherein said hemolysates are washed with water-insoluble inert organic solvent prior to electrophoresis.

5. The method of claim 4 wherein said solvent is toluene.

6. The method of claim 4 wherein said solvent is chloroform.